(12) United States Patent
Chen

(10) Patent No.: US 7,697,270 B2
(45) Date of Patent: Apr. 13, 2010

(54) PORTABLE ELECTRONIC DEVICE

(75) Inventor: Ping-Chou Chen, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 77 days.

(21) Appl. No.: 11/964,576

(22) Filed: Dec. 26, 2007

(65) Prior Publication Data
US 2009/0021899 A1    Jan. 22, 2009

(30) Foreign Application Priority Data
Jul. 18, 2007    (CN)    ............ 2007 1 0075210

(51) Int. Cl.
*G06F 1/16*    (2006.01)
(52) U.S. Cl. .............. 361/679.05; 455/575.1; 439/169
(58) Field of Classification Search ............ 361/679.05, 361/679.06, 679.3, 679.39, 679.56; 455/575.4, 455/575.1; 439/169
See application file for complete search history.

(56) References Cited

U.S. PATENT DOCUMENTS

| 2005/0079902 A1* | 4/2005 | Chen et al. ............... 455/575.4 |
| 2006/0142073 A1* | 6/2006 | Gordecki ................. 455/575.4 |
| 2009/0093285 A1* | 4/2009 | Weng et al. ............... 455/575.4 |

* cited by examiner

*Primary Examiner*—Hung V Duong
(74) *Attorney, Agent, or Firm*—Steven M. Reiss

(57) ABSTRACT

A portable electronic device includes a stationary cover (10), a sliding mechanism (40) fixed with the stationary cover, a first sliding body (20) slidably connected to the sliding mechanism; and a second sliding body (30) slidably connected to the sliding mechanism and arranged to be abreast with the first sliding body. The stationary cover is slidably connected with the first sliding body and the second sliding body by the sliding mechanism, and the first sliding body and/or the second sliding body are/is operative to reveal out from the stationary cover.

14 Claims, 8 Drawing Sheets

PORTABLE ELECTRONIC DEVICE

BACKGROUND OF THE INVENTION

1. Field of the Invention

The present invention relates to portable electronic devices, particularly to a portable electronic device with a dual-sliding structure.

2. Discussion of the Related Art

With the development of information technology, portable electronic devices have been increasingly widely used with multiplicity of functions. A mobile telephone is exemplified as a portable electronic device that provides wireless communication services to its subscriber. Rapid development in the field of information and telecommunication business has made it possible for mobile users to use a variety of functions and types of mobile phones available on the market. These mobile telephone terminals are generally classified into three or more types of terminals, such as, e.g., a bar-type terminal, a flip-type terminal with a flip cover, and a foldable terminal with a folding mechanism adapted to be opened and closed about a main body at a given angle.

In the meantime, as more diverse design concepts are introduced in the design of mobile communication terminals, a sliding type of mobile terminal has recently become widely used. The sliding-type terminal is quite popular because of its convenient operation and unconventional design. A general sliding-type terminal includes an upper housing, a main body and a sliding mechanism. The upper housing and the main body are slidably connected by the sliding mechanism. A screen is provided in the upper housing. A keypads module is configured in the main body. The upper housing is slidably opened or closed relative to the main body. However, these sliding type mobile terminals do not yet offer a wide keypads area, and for this reason, more than one different characters or numerals are usually set together in one key. Therefore, it may create an inconvenience for the users. In communication or in game, the users have to manually select a desired input content by pressing the same key many times.

Therefore, a portable electronic device (e.g., a mobile phone) with a new sliding mechanism is desired in order to overcome the above-described shortcomings.

SUMMARY

In one aspect thereof, a portable electronic device comprise a stationary cover, a sliding mechanism fixed with the stationary cover, a first sliding body slidably connected to the sliding mechanism; and a second sliding body slidably connected to the sliding mechanism and arranged to be abreast with the first sliding body. The stationary cover is slidably connected with the first sliding body and the second sliding body by the sliding mechanism, and the first sliding body and/or the second sliding body are/is operative to reveal out from the stationary cover.

Other advantages and novel features of the embodiments will become more apparent from the following detailed description thereof when taken in conjunction with the accompanying drawings.

BRIEF DESCRIPTION OF THE DRAWINGS

Many aspects of the portable electronic device can be better understood with reference to the following drawings. The components in the drawings are not necessarily to scale, the emphasis instead being placed upon clearly illustrating the principles of the present portable electronic device. Moreover, in the drawings, like reference numerals designate corresponding parts throughout the several views.

DETAILED DESCRIPTION OF THE PREFERRED EMBODIMENT

The present portable electronic device is suitable for a mobile phone, a digital camera, and so on.

Figure 1:
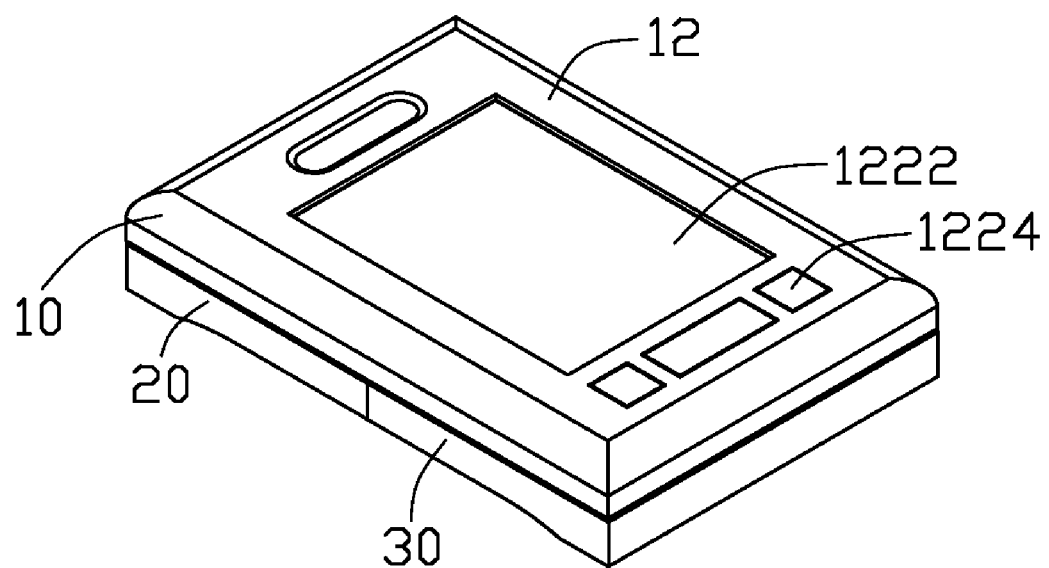
FIG. 1 is an assembled, isometric view of a portable electronic device, in accordance with a present embodiment.
Figure 2:
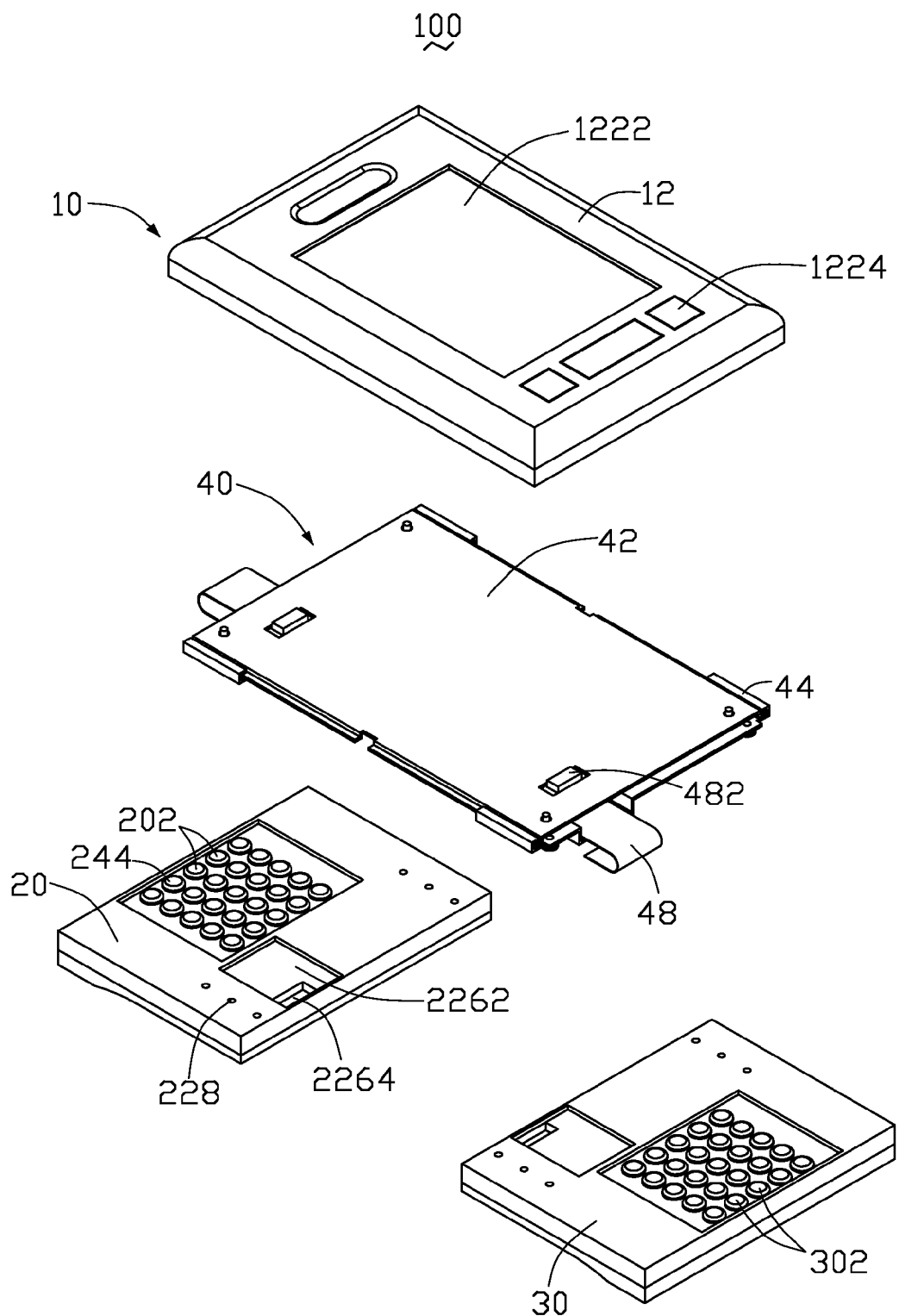
FIG. 2 is a modularized, exploded, isometric view of the portable electronic device shown in FIG. 1.

Referring to FIG. 1 and FIG. 2, an exemplary present mobile phone 100 includes a stationary cover 10, a first sliding body 20, a second sliding body 30 and a sliding mechanism 40. The first sliding body 20 and the second sliding body 30 are connected with the stationary cover 10 by the sliding mechanism 40. The first sliding body 20 and the second sliding body 30 can slide relative to the stationary cover 10.

Figure 3:
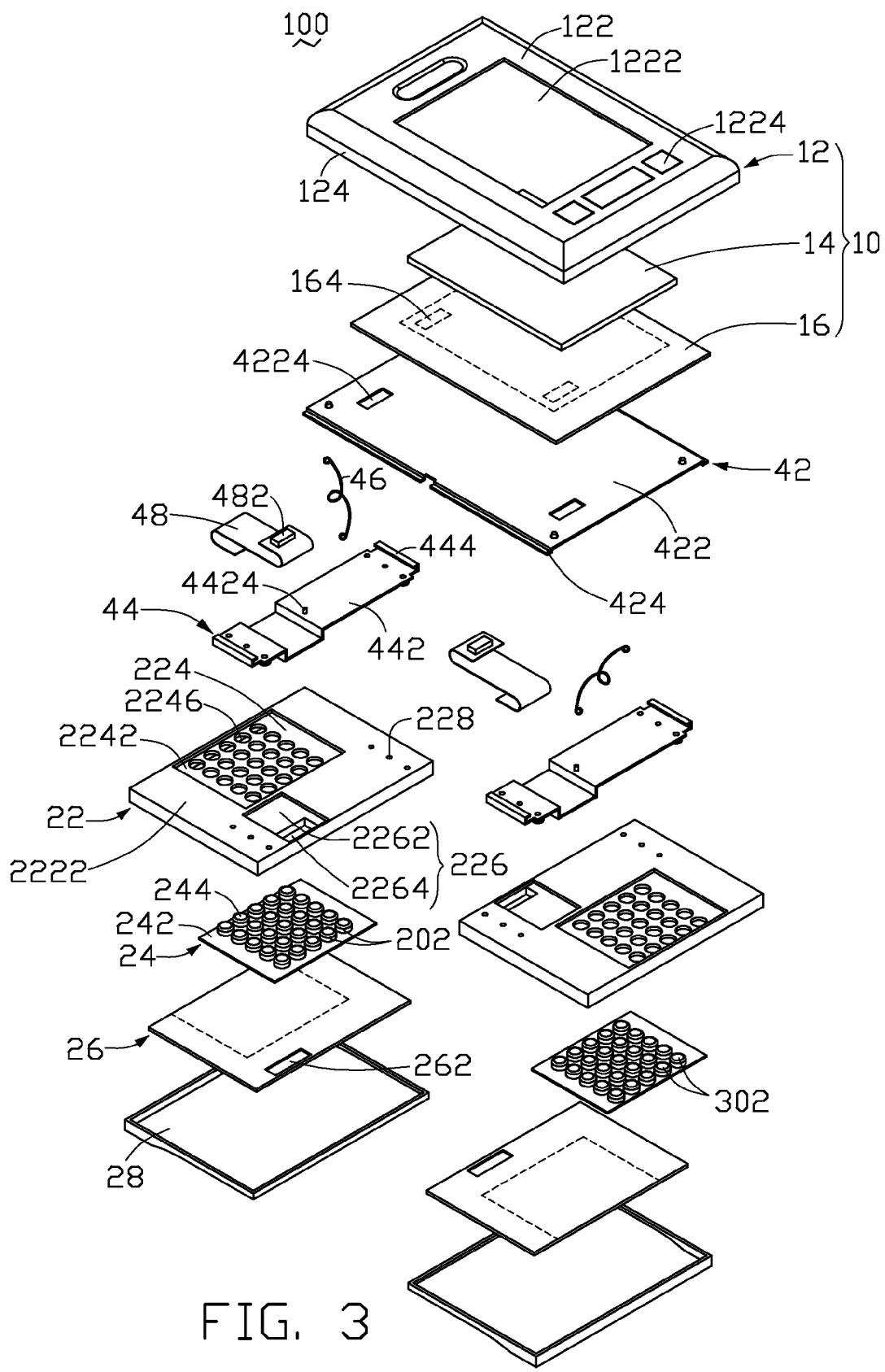
FIG. 3 is an exploded, isometric view of the portable electronic device shown in FIG. 1.
Figure 4:
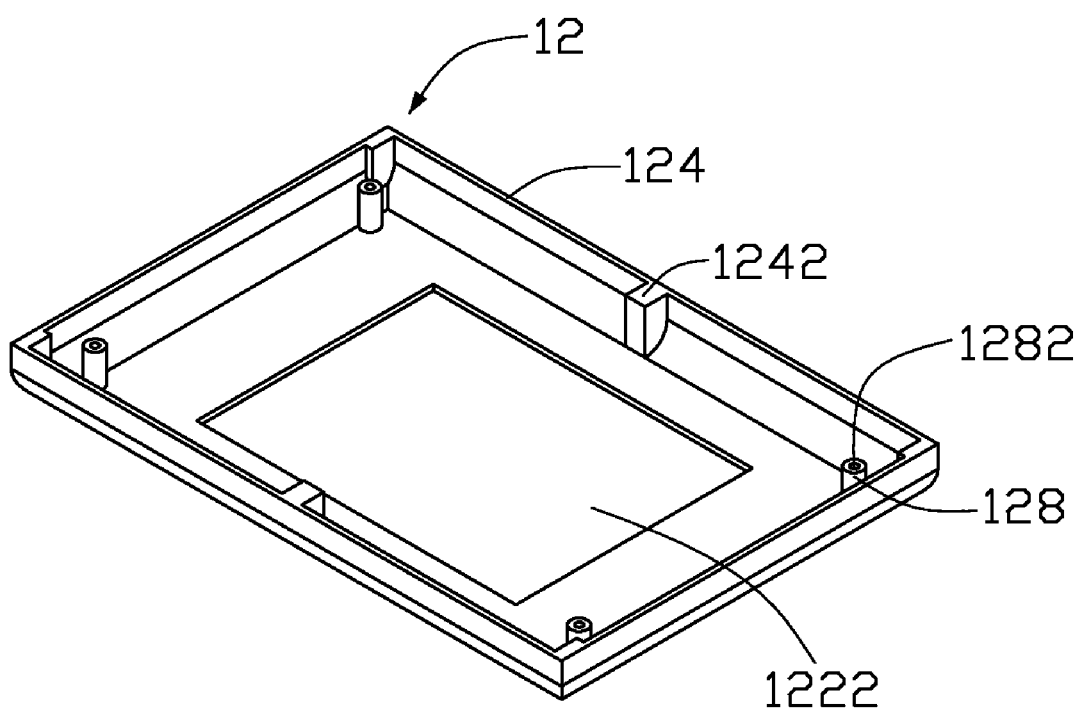
FIG. 4 is an isometric view of an upper cover of a stationary cover of the portable electronic device shown in FIG. 3, viewed from an inner aspect thereof.

Referring to FIG. 3 and FIG. 4, the stationary cover 10 includes a housing 12, a display unit 14 and a main circuit board 16. The housing 12 includes a main body 122 and a frame 124 extending perpendicularly from four edges of the main body 122. A screen hole 1222 is defined in a center of the main body 122. Function keys 1224 is provided next to the screen hole 1222 and adjacent to one edge of the main body 122. The function keys 1224 are used for activating or hanging up a call. Referring to FIG. 4 in detail, the main body 122 and the frame 124 define a receiving space therein for receiving the display unit 14 and the main circuit board 16. Two baffles 1242 extend from two opposite sidewalls of the frame 124, and face each other. In this embodiment, each baffle 1242 is located at a center of the corresponding sidewall. The baffles 1242 are provided for separating the first sliding body 20 from the second sliding body 30. Four posts 128 are respectively formed in four corners of the main body 122, near the sidewalls of the frame 124. An engaging hole 1282 is defined in each of the posts 128.

The display unit 14 is provided facing the screen hole 1222 and electronically connected with the main circuit board 16 of the mobile phone 100. The display content (e.g. images, characters) of the mobile phone 100 is shown on the display unit 14 and may be viewed through the screen hole 1222.

The main circuit board 16 is generally a rectangular board. The display unit 14 is set on a first surface of the main circuit board 16. Two first connecting portions 164 are symmetrically formed at an opposite surface of the main circuit board 16 for electronically connecting the first sliding body 20 and the second sliding body 30.

Figure 5:
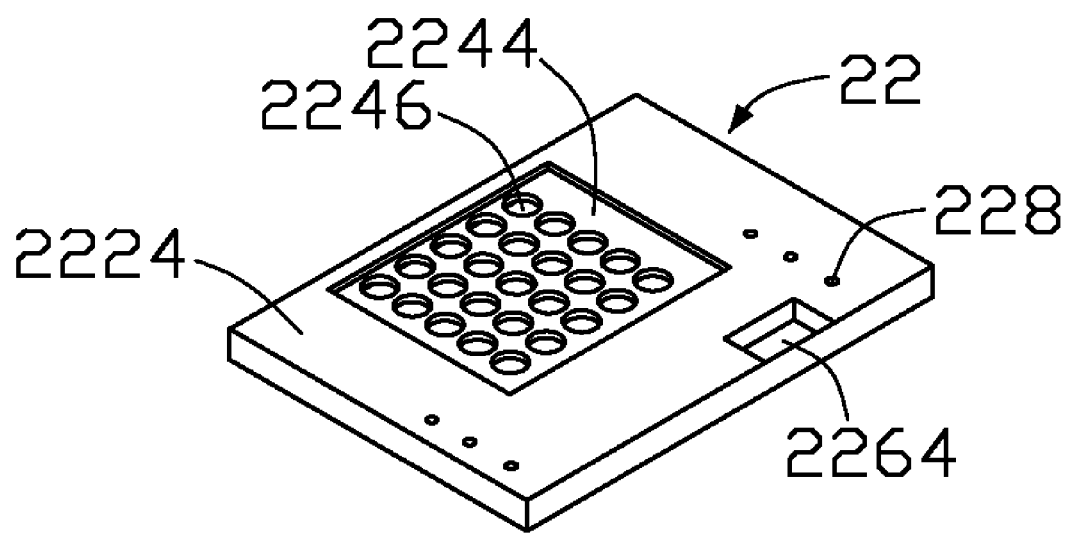
FIG. 5 is an isometric view of a top cover of a first sliding body of the portable electronic device shown in FIG. 3, viewed from another point of view.

Also referring to FIG. 5, the first sliding body 20 is structured and arranged to be slidably connected to the sliding mechanism 40. The first sliding body 20 includes a top cover 22, a keypad board 24, a secondary circuit board 26 and a base cover 28. The top cover 22 of the sliding body 20 is a rectangular board which includes a top wall 2222 and a bottom wall 2224. Referring to FIG. 3 in detail, in the top wall 2222, a keypad hole section 224 and a latching portion 226 are defined next to each other. The keypad hole section 224 includes a first recess 2242 defined in the top wall 2222 of the top cover 22. A plurality of through holes 2246 arranged in an array pattern are defined in the first recess 2242. A latching portion 226 includes a cavity 2262 and a first guiding hole 2264 defined in the cavity 2262. The first guiding hole 2264 is a through hole near an edge of the top cover 22. A plurality of first screw holes 228 are symmetrically defined in the top cover 22, near both ends of the top cover 22. In the bottom wall 2224 of the board 222, a second recess 2244 is defined corresponding to the first recess 2242. The through holes 2246 communicate with the first recess 2242 and the second recess 2244.

The keypad board 24 includes a board body 242 and a first keypad array 202 formed on the board body 242. The first keypad array 202 includes a plurality of keys 244 arranged in an array pattern. The arrangement of the keys 244 is in accordance with the arrangement of the through holes 2246 defined in the board 222. The keys 244 cooperate with the through holes 2246 and the first recess 2242. The board body 242 is sized to fit in the second recess 2244 in the bottom wall 2224 of the of the top cover 22.

The secondary circuit board 26 is provided for being electronically connected with the main circuit board 16. A second connecting portion 262 is defined adjacent to an edge of the secondary circuit board 26. The base cover 28 is provided for cooperating with the top cover 22, to fix and shield the keypad board 24 and the secondary circuit board 26 therein.

The second sliding body 30 is provided for being assembled with the stationary cover 10 abreast with the first sliding body 20. The second sliding body 30 is structured and arranged to be slidably connected to the sliding mechanism 40. The structure and assembly of the second sliding body 30 is same with the first sliding body 20. The only difference is that the function of the second keypad array 302 of the second sliding body 30 is different with the first keypad array 202 of the first sliding body 20.

Figure 6:
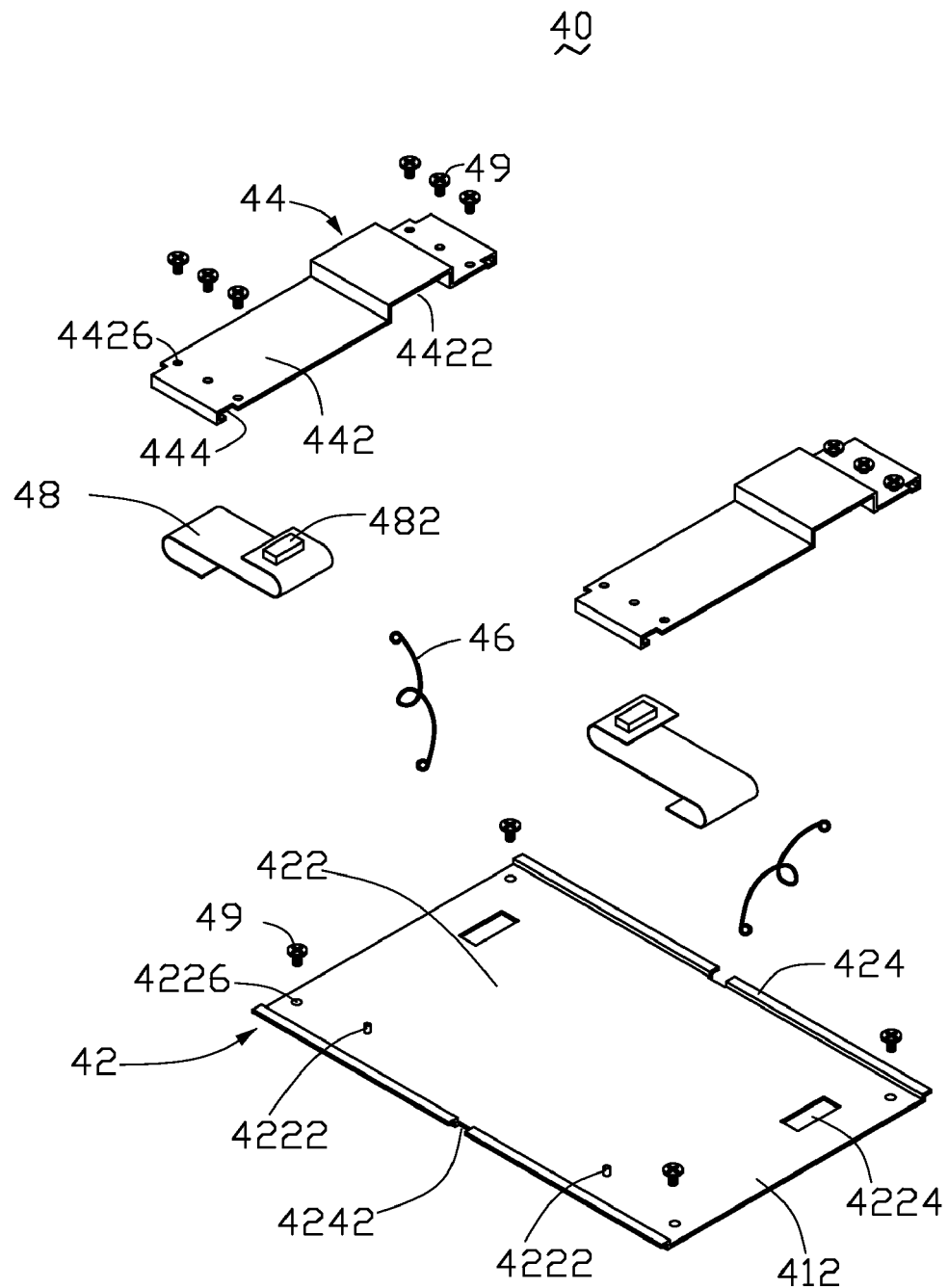
FIG. 6 is an exploded, isometric view of a sliding mechanism of the portable electronic device shown in FIG. 3.

Also referring to FIG. 6, the sliding mechanism 40 includes a fixing board 42, two sliding boards 44, two springs 46, two flexible printed circuit boards 48 and a plurality of screws 49. The fixing board 42 includes a rectangular board 422 and two L-shaped guiding rails 424 extending outwardly from two opposite sides of the rectangular board 422. A pair of notches 4242 are defined in the center of the two guiding rail 424. Each of the notches 4242 is provided for cooperating with a corresponding baffle 1242 on the housing 12 to separate the first sliding body 20 from the second sliding body 30 after the portable electronic device is assembled. Two first protruding posts 4222 are respectively formed on the rectangular board 422. A distance between each of the first protruding posts 4222 and the adjacent end of the rectangular board 422 is a quarter-length of the rectangular board 422. Two second guide holes 4224 are defined in the rectangular board 422 for receiving a portion of the two flexible printed circuit boards 48. Four fixing holes 4226 are defined near the four corners of the rectangular board 422.

The sliding board 44 includes a sliding board body 442 and two guiding slots 444 formed at both ends of the sliding board body 442. A length of the sliding board 44 is equal to a distance between two guiding rails 424 of the fixing board 42. A rectangular bended portion 4422 is formed in the sliding board body 442. The bended portion 4422 is provided to cooperate with the receiving cavity 2262 in the top cover 22. A second protruding post 4424 is formed on the sliding board body 442 of each sliding board 44. The second protruding post 4424 and the corresponding first protruding post 4222 are connected with two ends of the spring 46. A plurality of second screw holes 4426 are defined respectively adjacent to each of the two guiding slots 444. The plurality of second screw holes 4426 correspond to the plurality of first screw holes 228.

The spring 46 is a torsion spring. One end of the spring 46 is fixed with the first protruding post 4222 on the fixing board 42, and the other end of the spring 46 is fixed with the second protruding post 4424 on the sliding board 44. When the first sliding body 20 or the second sliding body 30 slides relative to the stationary cover 10, an elasticity of the spring 46 is provided for opening or closing the first sliding body 20 or the second sliding body 30.

The flexible printed circuit board 48 is provided with two connecting terminals 482 in both ends thereof. The screws 49 are provided for engaging in the engaging holes 1282 of the posts 128 through the fixing holes 4226, to fix the fixing board 42 and the main circuit board 16 to the stationary cover 10.

Referring to FIG. 2 and FIG. 6, in assembly, the display unit 14 is provided facing to the screen hole 1222 and set on a top surface of the main circuit board 16. The display unit 14 is electronically connected with the main circuit board 16.

One end of each spring 46 is connected with a corresponding first protruding post 4222, and the other end of each spring 46 is connected with a corresponding second protruding post 4424. The guiding slots 444 of the sliding board 44 are placed over both the guiding rails 424 of the fixing board 42, so that the sliding board 44 can slide along the guiding rails 424. The two sliding boards 44 are separated by the baffles 1242 and in two sides of the baffles 1242. Each of the flexible printed circuit boards 48 runs through the bended portion 4422 of a sliding board 44. One connecting terminal 482 of the flexible printed circuit board 48 is fixed in the second guiding hole 4224.

Each of the screws 49 is inserted through the corresponding fixing holes 4226 in the fixing board 42. The screws 49 engage with the engaging holes 1282 of the posts 128 on the housing 12 to fix the sliding mechanism 40 with the stationary cover 10. The two second guiding holes 4224 faces to the two first connecting portions 164 on the main circuit board 16. The connecting terminals 482 of the two flexible printed circuit board 48 extended out of the second guiding holes 4224 are electronically connected with the two first connecting portions 164 of the main circuit board 16.

Then, the first sliding body 20 is assembled. The keys 244 on the keypad board 24 are inserted through the through holes 2246 and received in both the first recess 2242 and the second recess 2244. The keypad board 24 is assembled on a surface of the secondary circuit board 26. The bottom cover 28 is assembled with the top cover 22, and the keypad board 24 and the secondary circuit board 26 are fixed and shielded therein.

The bended portion 4422 is received in the receiving cavity 2262. The screws 49 engage with the first screw holes 228 in the top cover 22 and the second screw holes 4426 in one sliding board 44 to fix the sliding body 20 with the sliding mechanism 40.

The secondary circuit board 26 is electronically connected with the main circuit board 16 by the flexible printed circuit board 48. The connecting terminal 482 of the flexible printed circuit board 48 exposed out of bended portion 4422 is inserted through the first guiding hole 2264 and electronically connected with the second connecting portion 262 in the secondary circuit board 26.

Because the structure and assembly of the second sliding body 30 is same with that of the first sliding body 20. The sliding body 30 is fixed with the other sliding board 44. The sliding board 44 is slidably mounted on the sliding mechanism 40. Now, the mobile phone 100 is assembled completely, as represented in FIG. 1.

Figure 7:
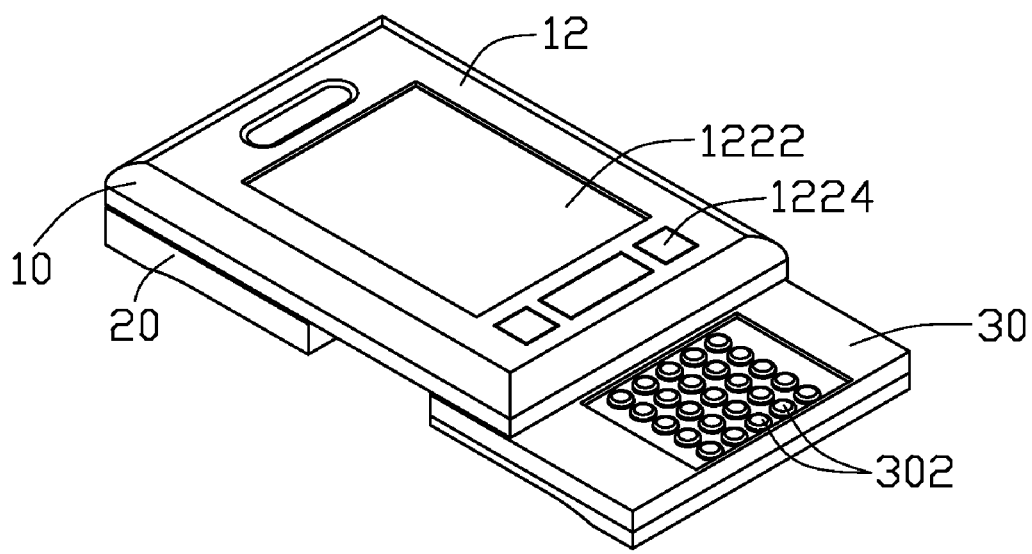
FIG. 7 is an isometric view of the portable electronic device in FIG. 1, showing a second sliding body in an open state.
Figure 8:
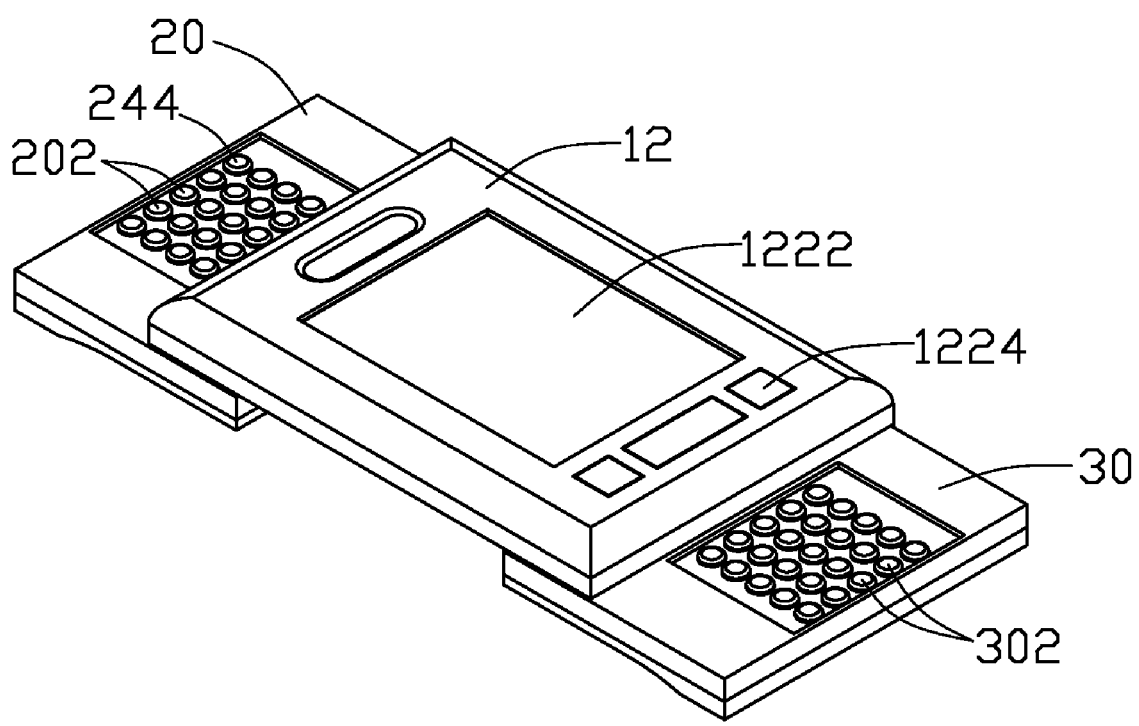
FIG. 8 is an isometric view of the portable electronic device in FIG. 1, showing a first sliding body and a second sliding body in an open state.

In use, the first sliding body 20 and the second sliding body 30 can slide at the same time relative to the stationary cover 10 in opposite directions or in the same direction. Both the first sliding body 20 and the second sliding body 30 can slide to distant ends of the stationary cover 10. When receiving a call, a user can answer the call with the mobile phone 100 being in a closed state as shown in FIG. 1, without sliding the first sliding body 20 and the second sliding body 30. Referring to FIG. 7, when making a call with the mobile phone 100, only the sliding body 20 is required to be slid out. Referring also to FIG. 8, when playing a game, the first sliding body 20 and the second sliding body 30 can both be slid out, and the keys thereon can be operated to perform various of functions. Obviously, there is a relatively broad keypad area for being operated conveniently.

Take the first sliding body 30 as an example, when the first sliding body 20 is in a closed position as shown in FIG. 1, the first protruding post 4222 and the second protruding post 4424 are stagger and there is a distance therebetween, so that the spring 46 provides a tensile force to make the first sliding body 20 in the closed position. If the first sliding body 20 slides from an open position from the closed position, the spring 46 should be shrunk until the sliding body 20 being moved to a critical point by outside force. In the critical point, the spring 46 is shrunk to be shortest. After that, the spring 46 provides a tensile force, so that the sliding body 20 slides automatically to the open position without outside force, as shown in FIG. 8. Contrarily, when the first sliding body 20 needs to slide from the open position from the closed position, the first sliding body 20 should be moved by outside force until it return the critical point, and then the spring 46 provides a tensile force to return sliding body 20 automatically to the closed position.

It should be understood that, the first sliding body 20 and the second sliding body 30 can be slid in the same direction or in opposite directions. The top cover 22, the keypad board 24 and the secondary printed circuit board 26 can be fixed in the base cover 28 after being fixed together by one or more screws engaging with screw holes defined thereon. Moreover, a battery (not shown) can be provided between the secondary printed circuit board 26 and the base cover 28.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device, comprising:
a stationary cover;
a sliding mechanism fixed with the stationary cover;
a first sliding body slidably connected to the sliding mechanism;
a second sliding body slidably connected to the sliding mechanism and arranged to be abreast with the first sliding body;
wherein the stationary cover is slidably connected with the first sliding body and the second sliding body by the sliding mechanism, and the first sliding body and/or the second sliding body are/is operative to reveal out from the stationary cover.

2. The portable electronic device as claimed in claim 1, wherein the stationary cover includes a display unit.

3. The portable electronic device as claimed in claim 1, wherein the stationary cover is electronically connected with the first sliding body and the second sliding body.

4. The portable electronic device as claimed in claim 1, wherein the first sliding body and the second sliding body are operative to slide in opposite directions or the same direction.

5. The portable electronic device as claimed in claim 1, wherein the stationary cover includes a housing which includes a main body and a frame extending perpendicularly from the main body; a pair of baffles extend from the frame, the first sliding body and the second sliding body are separated by the baffles.

6. The portable electronic device as claimed in claim 1, wherein the first sliding body includes a top cover, a keypad board, a secondary circuit board and a base cover that fixed together, a keypad hole section is provided in the top cover and cooperates with the keypad board, and the keypad board is electronically connected with the secondary circuit board.

7. The portable electronic device as claimed in claim 6, wherein the keypad hole section includes a first recess, a second recess formed in an opposite side of the first recess and a plurality of through holes communicating with the first recess and the second recess, the first recess and the second recess are correspondingly defined in two opposite walls of the keypad board.

8. The portable electronic device as claimed in claim 7, wherein a plurality of keys are formed on the keypad board, the keypad board is assembled in the second recess, and the keys are inserted through the through holes and received in both the first recess and the second recess.

9. The portable electronic device as claimed in claim 1, wherein the sliding mechanism includes a fixing board and two sliding boards, the fixing board is fixed with the stationary cover, the two sliding boards are respectively assembled with the first sliding body and the second sliding body.

10. The portable electronic device as claimed in claim 9, wherein the sliding mechanism further includes a pair of guiding rails formed in two sides of the fixing board and a pair of guiding slots formed in two ends of each sliding board, the guiding rails cooperating with the guiding slots.

11. The portable electronic device as claimed in claim 10, wherein the sliding mechanism further includes two springs, one end of each spring is connected with the fixing board, and the other end is connected with a corresponding sliding board.

12. The portable electronic device as claimed in claim 9, wherein the sliding board includes a bended portion, the first sliding body includes a top cover with a latching portion therein, the latching portion includes a cavity cooperating with the bended portion.

13. The portable electronic device as claimed in claim 12, wherein the sliding mechanism further includes two flexible printed circuit boards, the latching portion further includes a first guiding hole, two second guiding holes are defined in the fixing board, the two flexible printed circuit boards are respectively through the two second guiding holes and the corresponding first guiding hole to electronically connecting the stationary cover with the first sliding body and the second sliding body.

14. The portable electronic device as claimed in claim 9, further comprising at least one post provided in the stationary cover, and an engaging hole defined in each of at least one post, at least one fixing hole defined in the fixing board, at least one screw engaging with the engaging hole and the fixing hole to fix the fixing board with the stationary cover.

* * * * *